(12) United States Patent
Jakli (10) Patent No.: US 7,782,438 B2
(45) Date of Patent: Aug. 24, 2010

(54) FAST SWITCHING ELECTRO-OPTICAL DEVICES USING BANANA-SHAPED LIQUID CRYSTALS

(75) Inventor: Antal I. Jakli, Kent, OH (US)

(73) Assignee: Kent State University, Kent, OH (US)

( * ) Notice: Subject to any disclaimer, the term of this patent is extended or adjusted under 35 U.S.C. 154(b) by 342 days.

(21) Appl. No.: 11/762,501

(22) Filed: Jun. 13, 2007

(65) Prior Publication Data

US 2008/0002121 A1    Jan. 3, 2008

Related U.S. Application Data

(60) Provisional application No. 60/804,607, filed on Jun. 13, 2006.

(51) Int. Cl.
*G02F 1/133* (2006.01)
*G02F 1/1337* (2006.01)
*C09K 19/02* (2006.01)

(52) U.S. Cl. ............... 349/167; 349/33; 349/130; 349/132

(58) Field of Classification Search ............ None
See application file for complete search history.

(56) References Cited

U.S. PATENT DOCUMENTS 5,990,991 A    11/1999  Tillin et al.
6,057,821 A     5/2000  Hughes et al.

(Continued)

FOREIGN PATENT DOCUMENTS

JP    2003280041    10/2003

(Continued)

OTHER PUBLICATIONS

R.B. Meyer, Piezoelectric Effects in Liquid Crystals, vol. 22, No. 18, May 5, 1969; R.B. Meyer, Phys. Rev. Letters.

(Continued)

*Primary Examiner*—Michelle R Connelly Cushwa
(74) *Attorney, Agent, or Firm*—Hahn Loeser + Parks LLP; Scott M. Oldham, Esq.

(57) ABSTRACT

The invention is directed to liquid crystal display and electro-optical devices having faster switching times, a wider viewing angle, continuous gray level, improved transmittance of the clear state, approximately no threshold voltage and low power consumption. The aspects of the invention are achieved by a liquid crystal device comprising an orthogonal nematic, smectic or columnar liquid crystal phase, which is uniaxial in absence of electric field, but becomes biaxial when electric field is applied normal to the director (in between electrodes for planar alignment, or in-plane electric field in case of homeotropic alignment). This electric field induced biaxiality (EFIB) mode is provided using any dielectric orthogonal nematic, smectic or columnar bent-core liquid crystal phase. The nature of the switching is dielectric (not piezoelectric) and does not involve variation of layer spacing variation, so as to be mechanically much more stable than prior systems. The high switching speed combined with a large change in the effective birefringence and constant optical axis of the liquid crystal materials provide useful features in various applications, such as liquid crystal television, beam steering, spatial light modulators, and a variety of other applications.

19 Claims, 5 Drawing Sheets

Bookshelf alignment

U.S. PATENT DOCUMENTS

| | | | |
|---|---|---|---|
| 6,067,142 | A | 5/2000 | Anderson et al. |
| 6,130,739 | A | 10/2000 | Shimoshikiryo et al. |
| 6,440,506 | B1 | 8/2002 | Kojima |
| 6,493,055 | B1 | 12/2002 | Shimoshikiryo et al. |
| 6,593,987 | B1 | 7/2003 | Walton et al. |
| 6,661,488 | B1 | 12/2003 | Takeda et al. |
| 6,663,795 | B2 | 12/2003 | Shimoshikiryo et al. |
| 6,724,452 | B1 | 4/2004 | Takeda et al. |
| 6,762,819 | B2 | 7/2004 | Lee |
| 6,838,128 | B1 | 1/2005 | Wand et al. |
| 6,876,425 | B2 | 4/2005 | Yoo et al. |
| 6,896,939 | B2 | 5/2005 | Klasen-Memmer et al. |
| 6,914,653 | B2 | 7/2005 | Ichihashi |
| 6,924,009 | B2 | 8/2005 | Jakli et al. |
| 6,958,176 | B2 | 10/2005 | Li et al. |
| 7,009,677 | B2 | 3/2006 | Yoo et al. |
| 7,041,345 | B2 | 5/2006 | Kirsch et al. |
| 2002/0075445 | A1* | 6/2002 | Dabrowski et al. .......... 349/174 |
| 2005/0024548 | A1 | 2/2005 | Choi et al. |
| 2005/0174340 | A1 | 8/2005 | Jones |
| 2005/0243264 | A1 | 11/2005 | Sikharulidze |
| 2006/0115603 | A1 | 6/2006 | Francis |
| 2006/0115606 | A1 | 6/2006 | Ichinose et al. |

FOREIGN PATENT DOCUMENTS

| | | |
|---|---|---|
| JP | 2004020941 | 1/2004 |
| JP | 2004038206 | 2/2004 |
| JP | 2005091763 | 4/2005 |
| JP | 2006030748 | 2/2006 |

OTHER PUBLICATIONS

A. Jakli, L. Bata, A. Buka, N. Eber, I. Janossy: "New electromechanical effect in chiral smectic C * liquid crystals"; J. Phys. Lett. (Paris) 46,L-759-761 (1985).

Fodor-Csorba, A. Jakli, A. Vajda, E. Gacs-Baitz, S. K.Prasad, Shankar Rao, R. Y. Dong, J. Xu, G. Galli, "Giant electric field—induced birefringence in banana-shaped liquid crystals with carbonate end groups"; Angewandte Chemie (submitted in May 2006).

G. Pelzl, S. Diele, W. Weissflog, Adv. Mater., 11, pp. 707-724 (1999).

A. Jakli, W. Cao, Y. Huang, C.K. Lee, L-C. Chien, "Ferroelectric lyo-mesophase of banana-shaped molecules", Liq. Cryst., 28 (8), 1279-1283 (2001).

J.A. Olivares, S. Stojadinovic, T. Dingemans, S. Sprunt and A. Jakli, Physical Review E, 68, 041704 (2003).

D.A. Dunmur, K. Szumillin, and T.F. Waterworth, Mol. Cryst. Liq. Cryst., 149, ppg. 385-392 (1987).

Y. Shimbo, Y. Takanishi, K. Ishikawa, E. Gorecka, D. Pocieacha, J. Mieczkowski, K. Gomola, H. Takezoe, Jpn. J. Appl. Phys., 45, L282-L284 (2006).

A.G. Petrov et al., Mechanoelectricity of Guest-Host Membrane Systems:Lipid Bilayers Containing Ion Channels, Biomolecular Layers Laboratory, 6 pgs.

* cited by examiner

Bookshelf alignment

FIG. 1A  FIG. 1B

Vertical alignment

FAST SWITCHING ELECTRO-OPTICAL DEVICES USING BANANA-SHAPED LIQUID CRYSTALS

GOVERNMENT RIGHTS

The United States Government has a paid-up license in this invention and may have the right in limited circumstances to require the patent owner to license others on reasonable terms as provided for by the terms of Grant DMS-0456221, awarded by the National Science Foundation and a National Science Foundation International U.S./Hungary travel grant INT-0225963.

TECHNICAL FIELD

The present invention is directed to an electro-optical liquid crystal device made with banana-shaped or bent core liquid crystal molecules. These devices, which may be used for fast switching electric field-induced-biaxial (EFIB) displays, electro-optical switching and electro-optical storage, utilize an orthogonal dielectric phase of the banana-shaped molecules.

BACKGROUND OF THE INVENTION

Liquid crystal materials are materials which occupy an intermediate state between crystalline solid materials and isotropic liquid materials. Liquid crystal materials, while exhibiting an orientational order, do not typically exhibit a positional order. The unique properties of liquid crystal materials have enabled their use in a variety of display applications. Among the useful properties of liquid crystal materials in display applications are the reflection and refraction of light by the liquid crystal (LC) and the ability of the user to influence these properties. These properties are governed by the orientation of the molecules which comprise the liquid crystal. The orientation of individual molecules often determines the behavior of layers and phases of these molecules.

The lack of mirror symmetry of individual molecules is described as the chirality or "handedness" of the molecule. Many liquid crystal phases are chiral due to the introduction of chirality of the same sign at the molecular level. Examples of these types of chiral liquid crystal phases include cholesteric, blue, Twist Grain Boundary (TGB) and smectic C* phases. Due to the long-range orientation order of liquid crystalline phases, and the chirality of the molecules, a spontaneous twist occurs in a micrometer range. The chirality transfers from a molecular to mesoscopic range, and the phase becomes chiral.

Two molecules that are identical in composition yet are mirror images of each other are described as having opposite chirality. This is generally expressed as the molecules being left-handed or right-handed depending on their particular orientation. Liquid crystal molecules having the same chemical formula but opposite chirality will behave in optically similar, but oppositely directed ways.

Scattering type devices are very well known in liquid crystal displays. Two known types are polymer dispersed liquid crystals (PDLC), and polymer network containing liquid crystals (PNLC). Liquid crystal polymer dispersions form a broad class of materials in which the weight concentration of polymer ranges from 2% to 90%, depending on the application and type of polymer used. Dispersions, wherein the liquid crystal forms nearly spherical droplets randomly distributed throughout a polymer matrix, and the polymer concentration is 20% or more, are normally referred to as polymer dispersed liquid crystals (PDLC). Normally, PDLCs are light scattering in the "off" state and transparent in the "on" state. It is also possible to make reverse mode PDLCs. The display modes, however, cannot be interchanged.

PNLCs are formed by photopolymerization of a mixture containing less than 10% of a reactive monomer in an aligned liquid crystal host, such as a nematic, ferroelectric, or cholesteric phase liquid crystal material. The alignment may be assisted by surface alignment layers or by external fields. The polymerization induces phase separation of an initially homogeneous mixture. The morphology of the polymer network depends on the orientational order of the liquid crystal, properties of the monomer, and the presence of external aligning fields and/or conventional alignment layers applied to the cell surfaces. Normally, PNLCs work as reverse mode PDLCs. It is also possible to make PNLCs that are opaque at zero fields. Once made, however, the display modes cannot be interchanged. The switching times in PDLCs and PNLCs are typically over a millisecond, which is not optimal for most video applications. Moreover, the viewing angle and transmittance of the clear state are limited.

Thus, most liquid crystals switch relatively slowly (over one millisecond). This speed is insufficient for many applications, such as beam steering, spatial light modulators, Deep Fade Protector, Modulated Retro-Reflector, and many others. Such applications require much faster switching times in order for liquid crystals to be effectively used in place of other display systems.

So far the electroclinic effect (electric field-induced director tilt) near the paraelectric—ferroelectric (i.e. a SmA*-SmC*) phase transition offer the fastest liquid crystal switching, however the alignment is unstable due to the layer spacing modulation during switching and has strong temperature dependences, restricting the effect in about 5 degrees range around the SmA*-SmC* phase transition. Ferroelectric liquid crystals (FLCs) also offer fast, about 10-100 microseconds switching without the temperature range restrictions, but the switching ruins the alignment on the long run due to the field induced mechanical deformations associated with the piezoelectric nature of the materials.

In light of the foregoing, it is evident that there is a need in the art for an electro-optical liquid crystal device which has faster switching times, a wider viewing angle, improved stability and low threshold voltage. It would be additionally advantageous if the liquid crystal device contained electro-optical storage functionality.

BRIEF SUMMARY OF THE INVENTION

The invention in one aspect is therefore directed to liquid crystal display devices having faster switching times, a wider viewing angle, continuous gray level, improved transmittance of the clear state, approximately no threshold voltage and low power consumption.

The aspects of the invention are achieved by a liquid crystal device comprising an orthogonal nematic, smectic or columnar liquid crystal phase, which is uniaxial in absence of electric field, but becomes biaxial when electric field is applied normal to the director (in between electrodes for planar alignment, or in-plane electric field in case of homeotropic alignment). This electric field induced biaxiality (EFIB) mode is provided using any dielectric orthogonal nematic, smectic or columnar bent-core liquid crystal phase.

The nature of the switching is dielectric (not piezoelectric) and does not involve variation of layer spacing variation, so as to be mechanically much more stable than prior systems. The high switching speed combined with a large change in the effective birefringence and constant optical axis of the matel-iquid crystal materials provide useful features in various applications, such as liquid crystal television, beam steering, spatial light modulators, Deep Fade Protector, Modulated Retro-Reflector, etc. The variable birefringence allows for compensation of the birefringence of plastic substrates, or with proper driving scheme allows fast switching flexible displays with excellent black and white grey-scale.

These and other aspects of the invention will be described in association with particular embodiments, and in conjunction with the figures.

BRIEF DESCRIPTION OF THE DRAWINGS

For a complete understanding of the objects, techniques and structure of the invention, reference should be made to the following detailed description and accompanying drawings, wherein.

DETAILED DESCRIPTION OF THE INVENTION

Figure 1A:
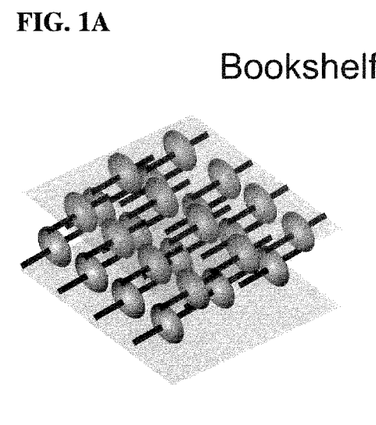
FIG. 1A shows a schematic illustration of a field-induced biaxiality (FIB) display using bookshelf alignment.
Figure 1B:
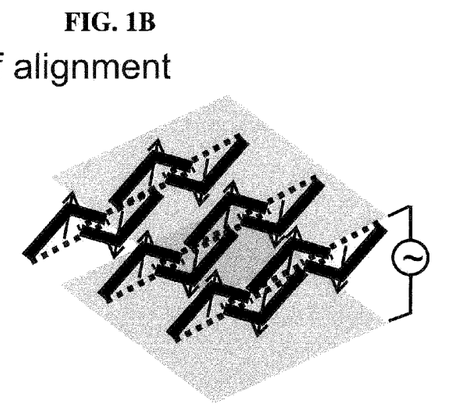
FIG. 1B shows a schematic illustration of a field-induced biaxiality (FIB) display using bookshelf alignment.
Figure 2A:
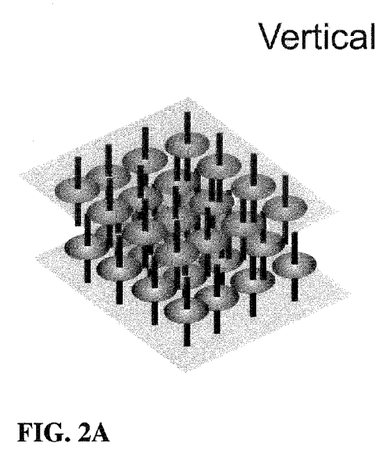
FIG. 2A shows a schematic illustration of a field-induced biaxiality (FIB) display using vertical alignment.
Figure 2B:
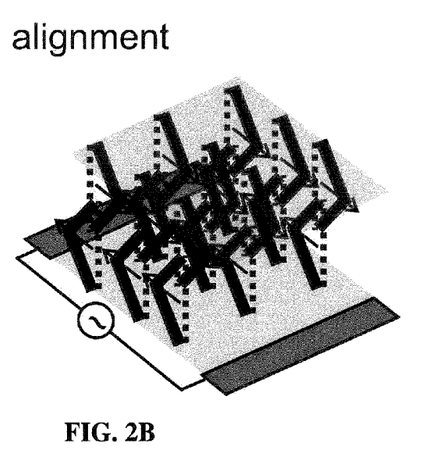
FIG. 2B shows a schematic illustration of a field-induced biaxiality (FIB) display using vertical alignment.

Orthogonal phases of achiral banana-shaped liquid crystal molecules have been observed. Banana-shaped or "bent core" liquid crystal molecules are individually symmetric and therefore have no chirality individually. As shown in FIGS. 1 and 2, the present invention is directed to making an orthogonal nematic, smectic or columnar liquid crystal phase, which is uniaxial in absence of electric field, but becomes biaxial when electric field is applied normal to the director (in between electrodes for planar alignment, or in-plane electric field in case of homeotropic alignment). In this description, this electric field induced biaxiality (EFIB) mode will be explained according to an example of an interdigitated banana SmA (also known as $B_6$ phase) in FIG. 1. It should be understood though, that the principle is the same however for all dielectric orthogonal nematic, smectic or columnar bent-core phases.

At zero fields in the bent-core SmA phase, the molecules can freely rotate around their long axes, i.e., all elements of the director orientation are present. This structure has the same property in any direction normal to the average molecular axis, corresponding to a uniaxial situation. Due to the biaxial nature of the individual molecules (properties are different in parallel and normal to the molecular plane of a bent-core unit), an electric field applied normal to the long axis of the molecules (which have negative dielectric anisotropies due to their symmetric bent shape) will reorient the molecular plane either parallel or perpendicular to the electric field, depending on the sign of the biaxiality value. This effect leads to a fast change of the effective birefringence both in the bookshelf alignment as shown in FIGS. 1A and 1B, where layers are normal to the substrates, and in the homeotropic arrangement of FIGS. 2A and 2B, where layers are parallel to the substrates. In case of the bookshelf structure of FIGS. 1A and 1B, the electric field is applied across the film and the structure is changing the birefringence from a non-zero value to either a lower or higher value depending on the sign of biaxiality. In case of the vertical (homeotropic) alignment as shown in FIGS. 2A and 2B, the electric field is supplied parallel to the substrates by means of electrode stripes patterned in one of the substrates (in plane switching). It should be understood that a feature of this switching is that the effective birefringence of the sample is zero for normal light incidence (black between crossed polarizers) when the electric field is zero, and it is non-zero (i.e., in the order of $n_a \cdot \sin^2 \theta$, where $n_a$ is the birefringence and $\mu$ is the kink angle of the molecules) when an electric field is applied.

Figure 3:
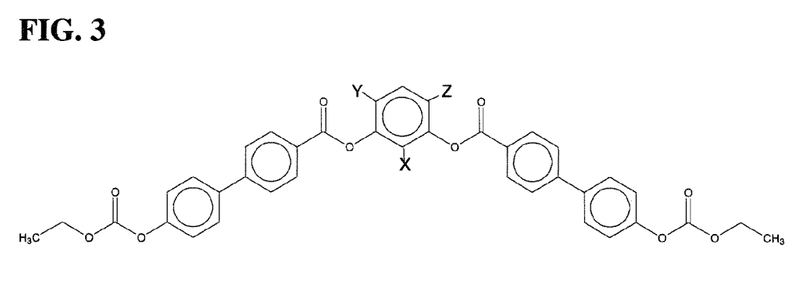
FIG. 3 shows the chemical structure of an embodiment of the invention using a symmetrical bent-core mesogens, being one of a symmetrical substituted 1,3-phenylene bis{4'-[(ethoxycarbonyl)oxy]-1,1'-biphenyl}-4-carboxylate material, with the substituents X, Y and Z being hydrogen, and a symmetrical substituted 1,3-phenylene bis{4'-[(ethoxycarbonyl)oxy]-1,1'-biphenyl}-4-carboxylate material, with the substituents X and Z being hydrogen and Y being chlorine.

As an example, the invention will be described relative to two symmetrical bent-core mesogens, substituted 1,3-phenylene bis{4'-[(ethoxycarbonyl)oxy]-1,1'-biphenyl}-4-carboxylates materials, which molecular structures are depicted in FIG. 3. In the material shown in FIG. 3, a first mesogen has the substituents X, Y and Z are hydrogen, whereas the second mesogen, X and Z are hydrogens, whereas Y is a chlorine. These two mesogens will be referred to as Material I and Material II respectively for purposes of this description. Material I has only a uniaxial smectic phase between 175° C. and 141° C., whereas II has Iso 137° C. N 107° C. SmA<23° C. Cr phase sequence. X-ray investigations show a periodicity exactly half of the molecular length indicating an intercalated smectic phase similar to that shown in FIG. 1, which in bent-core liquid crystal materials is also known as $B_6$ phase.

In this example, the $B_6$ range of Material II already has the required mesophase in a wide temperature range, including room temperature. Also, to further reduce the phase transition temperatures one can make mixtures, or add small bent-core molecules, such as meta-xylene, which can decrease the phase transitions, the viscosity and threshold switching fields.

Figure 4A:
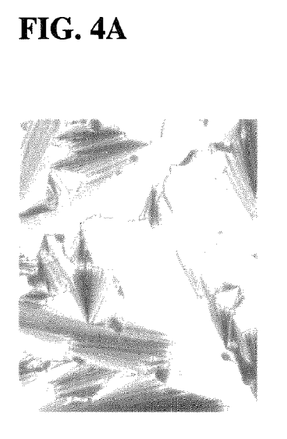
FIGS. 4A-4C are a photomicrographs of textures of a film according to an embodiment of the present invention, at varying applied voltage.
Figure 4B:
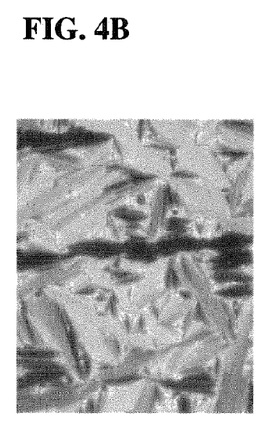
Figure 4C:
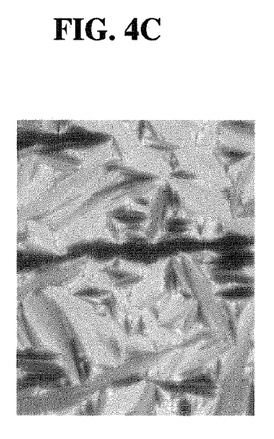

The electro-optical observations in the smectic phase of Materials I and II reveal strong and fast field-induced biaxiality. As an example, textural changes in a 5.5 μm film of Material I are shown in FIGS. 4A-4C. In these FIGS. the 5.5 μm film of Material I is shown in planar alignment at 162° C. for applied voltages of 0V in FIG. 4A, 64V in FIG. 4B and 120V in FIG. 4C. The pictures indicate a change of the color relating to the field-induced increase of the birefringence. In these photomicrographs, the polarizers are along the edges of the pictures. The focal conic domains as shown in FIG. 4 indicate orthogonal smectic structure, where the electric field results in a strong color change from yellow to blue. The color change represents up to 15% change of the birefringence at 20V/μm fields, and depending on other characteristics, variable birefringence can be controlled for a particular application. The resulting devices may be manipulated such that they may be reversibly changed from a light scattering state to a transparent state and vice versa. These devices include, but are not limited to flexible displays, LCTV's, computer displays, computer monitors, signs, shutters, beam steering devices, optical gratings, other optical devices or any other device that transmits, reflects or modulates light of any wavelength. The reversibility between states is preferably performed with application of electric fields, but could also be accomplished in other known manners.

For many optical devices, the phases of the bent core molecules may be obtained by applying electric fields of different magnitude and/or frequency. Also, the magnitude and shape of the applied electric field such as square or triangular, may be used to obtain a desired state. All of these states are obtained without the need of alignment layers, although the use of alignment materials may be desirable for some applications. Further information regarding the nature of the bent core molecules is set forth in U.S. Pat. No. 6,924,009, which is hereby incorporated herein by reference.

Figure 5:
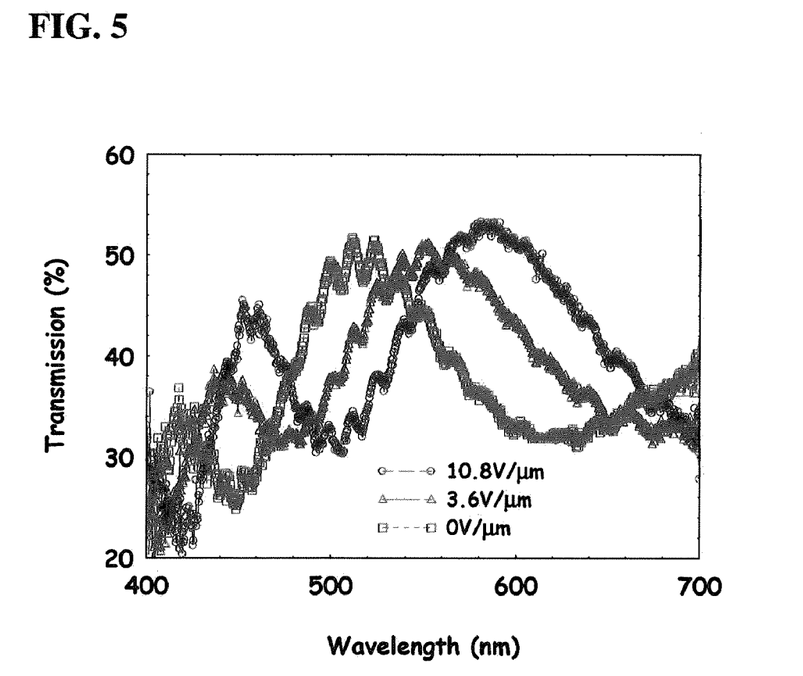
FIG. 5 is a graphical representation of the transmission spectra of a cell according to an embodiment of the invention, and showing the increase of birefringence with varying applied voltage.

For this example, the birefringence and its change were quantitatively measured by analyzing the transmission spectra in between crossed polarizers, with the results shown in FIG. 5. In FIG. 5, the transmission spectra of 5.5 μm slab at 155° C. in planar alignment between crossed polarizers. The shift of the minima and maxima with the applied field shows that the birefringence is increasing. From the analysis of the positions of the minima and maxima, these measurements of a specific example indicate birefringence is increasing from 0.31 to 0.33@500 nm.

Figure 6:
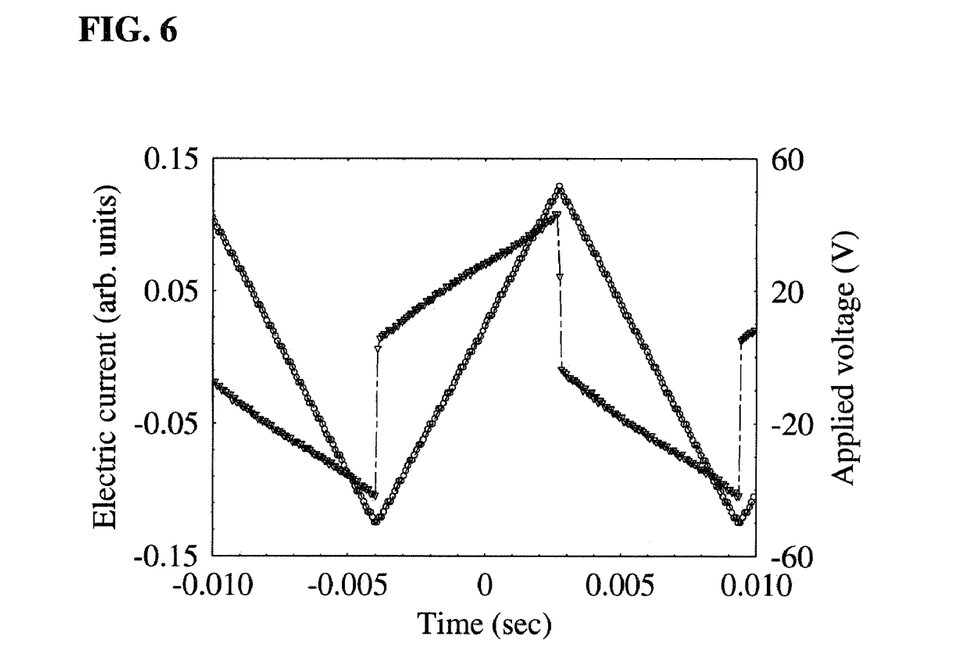
FIG. 6 is a graphical representation of the time dependence of the electric current under triangular electric field excitation for an embodiment.

As seen in FIG. 5, the birefringence is very large (0.31 at 500 nm) even at zero voltage and 0.33 under 10V/μm fields. The optical switching between the different birefringent states is less than one microsecond (limited by the speed of the photodiode and of the voltage source), and does not involve change of the optical axis. The optical switching was not accompanied by a polarization current, indicating its dielectric origin. The dielectric nature of switching is also seen in textural studies under low frequency rectangular electric fields, where only transient color change was observed. The birefringence change is not accompanied by ferroelectric or antiferroelectric type polarization peaks in the electric current measurements, indicating the dielectric origin of the optical effect, as shown in FIG. 6, where the time dependence of the electric current under triangular electric field excitation is shown. The absence of the peak indicates dielectric origin of the response.

Figure 7A:
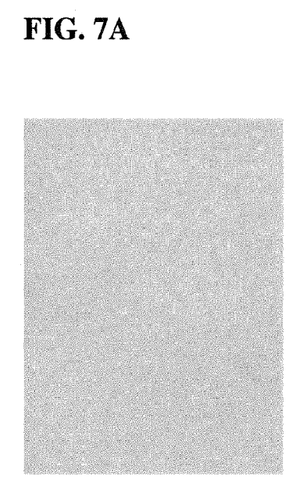
FIGS. 7A-7C are photomicrographs showing characteristics of textures provided by an embodiment of the invention.
Figure 7B:
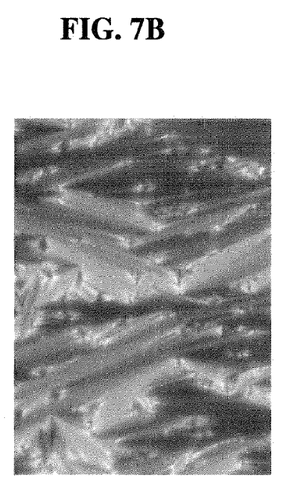
Figure 7C:
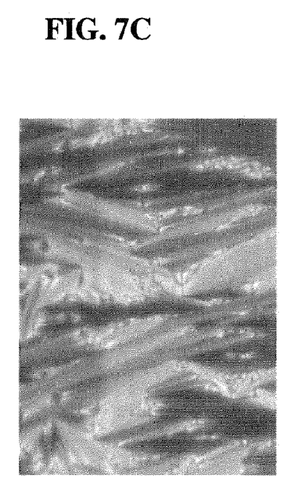

Also, Material II shows a strong field-induced-variation of birefringence in the smectic phase. Characteristic textures of Material II are shown in FIGS. 7A-7C, with FIG. 7A showing a photomicrograph of the texture at a temperature of 135° C., indicating the N phase. FIG. 7B shows the texture at a temperature of 100° C. SmA phase at zero electric fields. FIG. 7C shows texture at 100° C. SmA phase at 8V/μm rectangular electric field applied to the right side of the texture (electrode area). In this example, the arrow shown in FIG. 7B is 0.1 mm long, and its direction indicates the rubbing direction. Typical texture at the border line of electrode and non-electrode area of a 5 μm film is shown in FIG. 7C. It can be seen that the birefringence is much larger in the area where 8V/μm 23 Hz rectangular field is applied. Material II also show characteristics similar to Material I as shown in FIG. 6. The threshold voltage to induced birefringence also shows a strong temperature dependence (~4V/μm at 105° C., 8V/μm at 78° C.), but is still observable down to room temperature under 30V/μm fields.

Figure 8A:
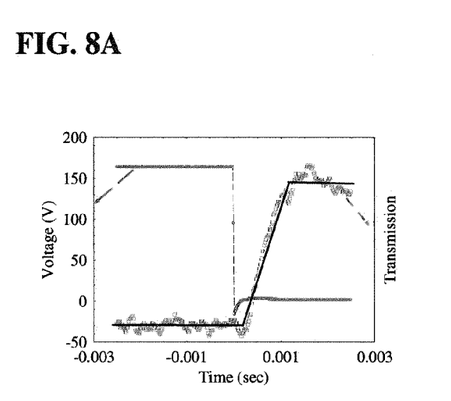
FIGS. 8A and 8B are graphical representations showing the time dependencies of the transmittances in an embodiment, showing the turning off of an applied electric field and after turning on an applied electric field.
Figure 8B:
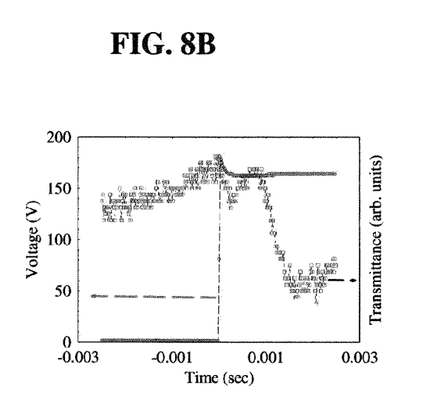

In accordance with this embodiment of the invention, it is noted that the dielectric response means the direction of the kink remains alternating in between layers, even when field is applied. From the color change, the value of the field-induced biaxialilty is estimated as δn=0.02 at 5-10V/μm electric fields. This biaxility is about one (three) orders magnitude larger than that observed in bent-core (calamitic) nematic liquid crystals. As the birefringence is increasing with applied electric fields, on average the molecular dipole moment is larger in the plane of the molecules, than normal to it. Further, as an example shown in FIGS. 8A and 8B, a planar 8 μm film provides time dependencies of the transmittances which are less than a millisecond. In FIG. 8A, the time dependency of the 8 μm film is shown in association with turning off the applied electric field, while in FIG. 8B, the time dependency is shown after turning on the electric field. The time dependence of the transmittances show that both the fall time and rise time are less than a millisecond. The rise time depends strongly on the applied field, whereas the fall time is mainly independent of the voltage and is determined by the strength of the uniaxial order.

In the present invention, the paraelectric-ferroelectric transition does not require it be induced by the applied electric field where the polarization has to be fully (180 degrees) rotated by means of rotation of the director around the long axis during each period of the applied ac field. In the present invention, due to the intercalated layer structure of the $B_6$ phase as for example, the rotation of the polarization of the individual layers is not possible, because it would disrupt the intercalated structure. This ensures that the kink orientations of the next layer molecules remain antiparallel with respect to each other, i.e., the ferroelectric coupling is ineffective and only the dielectric biaxiality can be used for switching, as shown in FIGS. 1A and 1B. The electric field induced biaxiality does not require a 180 degree rotation, but only less than 90 degrees rotation of the director around the long axis. Also, the director does not need to be rotated back and forth during the application of a constant AC field. This makes the power consumption much less than in ferroelectric switching.

Figure 9:
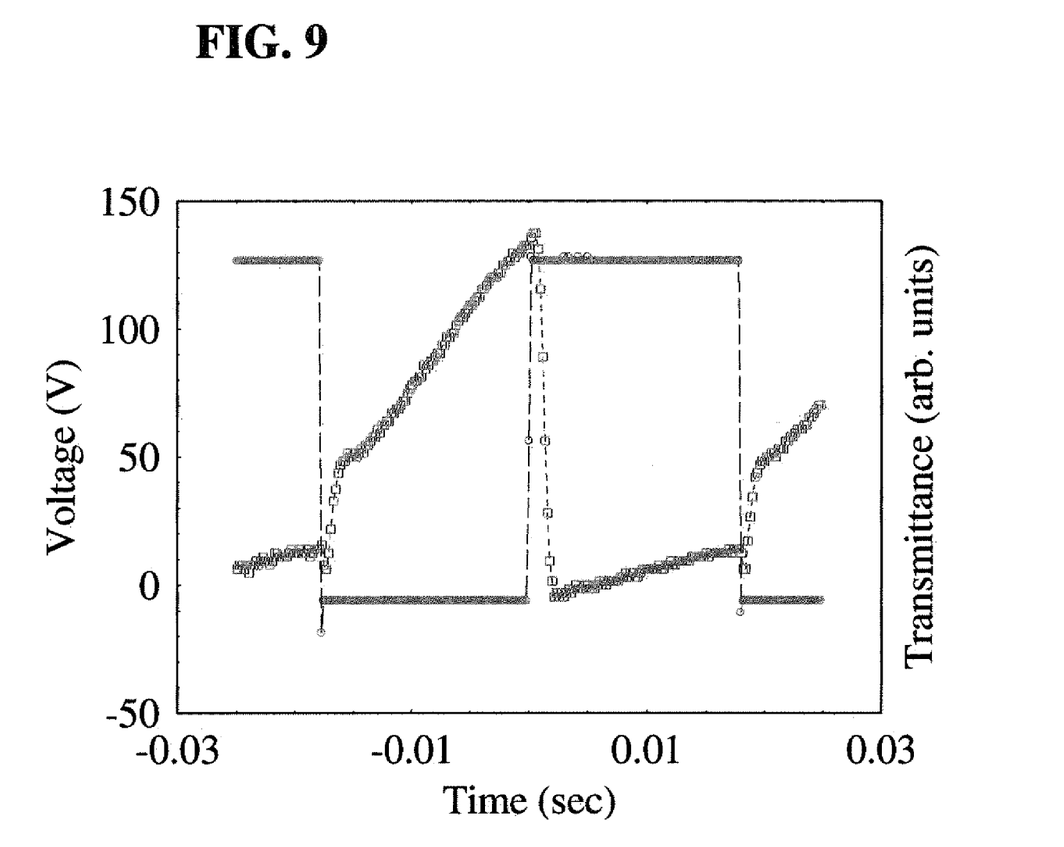
FIG. 9 is a graphical representation showing the time dependence of the transmittance in an embodiment, showing the transmittance in the nematic phase.

The electric field induced biaxiality could also be observed in the nematic phase as shown in FIG. 9, where the time dependence of the transmittance in the nematic phase at 118° C. is shown. Although switching times are somewhat slower, such characteristics may be useful for certain applications.

The devices according to the invention provide high switching speed combined with a large change in the effective birefringence and constant optical axis, which provides useful features for various applications. The variable birefringence allows compensating the birefringence of plastic substrates, or equivalently with a proper driving scheme, allows fast switching flexible displays with excellent black and white grey-scale. Thus, the invention makes it possible to construct a flexible device that will allow the characteristics of the induced biaxiality, such as in a vertically aligned in-plane electric field induced biaxiality (VA-EFIB) display.

Liquid crystal materials suitable for use in the methods and devices of the present invention, being banana-shaped or bent core molecules may be used to prepare a light modulating device comprising a pair of opposed substrates, which may be glass, plastic or other material commonly known in the art. Transparent electrodes may be disposed on substrates to provide applied electric fields and perform switching functions. As an example, the electrodes may be indium-tin oxide. A power source is selectively attached to electrodes, such as by means of a switch, which can be controlled through an electronic driving scheme and system. For displays, the use of an electronic driver circuit may allow particular areas of a matrix cell device to be addressed, which in turn allows high contrast between the areas. The banana-shaped LC material is disposed between substrates by any known method in the art, such as capillary action, for example, and the cell may be sealed.

The liquid crystal devices of the present invention have commercial application possibilities in all the areas where PDLC's or PNLC's are currently used. This includes LC television, flexible displays, beam steering devices, spatial light modulators, Deep Fade Protector, Modulated Retro-Reflector, etc. and many other optical or electro-optical devices and the like. In addition, because the performance of the devices according to the present invention is superior in various aspects, including large viewing angle, extremely fast switching times, large variation in effective birefringence and constant optical axis, the application possibilities are very broad. A device according to the invention could also be used in electronic newspapers, or in other optical data storage devices for example. In addition, a display can be switched to a video mode, and switched at a video rate for viewing motion pictures or video. These capabilities make displays according to the invention possibly would make it useful in cellular phones, smart phones, PDA's, laptops or palmtops, flexible displays, etc. They also can be used in guest-host type displays with dichroic dyes. Furthermore, it is envisioned that they could be used in one and two dimensional switchable gratings for beam steering, and as optical switches for example. The invention provides multistable storage devices with desired black and white gray scale properties.

Thus, it can be seen that the examples set forth various structures and methods for uses as presented above. While the invention has been described with reference to specific examples, it is to be understood that the invention is not limited thereto or thereby. Accordingly, for an appreciation of true scope and breadth of the invention, reference should be made to the following claims.

What is claimed is:

1. A liquid crystal cell comprising a pair of walls having a bent core liquid crystal material in an orthogonal nematic, smectic or columnar liquid crystal phase disposed therebetween, which is uniaxial in absence of electric field, and becomes biaxial when an electric field is applied normal to the directors of the liquid crystal material, wherein said cell can be reversibly switched between clear and opaque states.

2. A liquid crystal cell according to claim 1, wherein the bent core liquid crystal material is formed into planar alignment, and the electric field is applied between electrodes provided on the cell.

3. A liquid crystal cell according to claim 1, wherein the bent core liquid crystal material is formed into homeotropic alignment, and the electric field is applied in-plane with the cell walls by means of electrodes provided on the cell.

4. An electro-optical switching device comprising a liquid crystal cell according to claim 1.

5. A liquid crystal light modulating device comprising:
a pair of opposed substrates with at least one transparent electrode to provide selective application of an electric field,
a bent-core liquid crystalline material in an orthogonal smectic liquid crystal phase disposed between the substrates, wherein the liquid crystal material exhibits an electric field induced biaxiality upon application of an electric field.

6. The liquid crystal device of claim 5, wherein the liquid crystalline material has an intercalated layer structure in a $B_6$ phase.

7. The liquid crystal device of claim 5, wherein the liquid crystalline material is dielectrically switchable upon application of the electric field.

8. The liquid crystal device of claim 7, wherein the liquid crystalline material has an optical switching speed of less than 1 ms.

9. The liquid crystal device of claim 5, wherein the liquid crystalline material has an effective birefringence of zero for normal light incidence when the electric field is zero.

10. The liquid crystal device of claim 5, wherein the liquid crystalline material has a variable birefringence upon application of the electric field.

11. The liquid crystal device mode of claim 10, wherein the liquid crystalline material has an effective birefringence greater than zero upon application of the electric field.

12. The liquid crystal device of claim 10, wherein the effective birefringence increases as the applied electric field increases.

13. The liquid crystal device of claim 5, wherein the liquid crystalline material is a substituted 1,3-phenylene bis{4'-[(ethoxycarbonyl)oxy]-1,1'-biphyenl}-4-carboxylate.

14. The liquid crystal device of claim 5, wherein the liquid crystalline material is represented by the formula:

wherein X, Y, and Z are each hydrogen atoms.

15. The liquid crystal device of claim 5, wherein the liquid crystalline material is represented by the formula:

wherein X and Z are hydrogen atoms and Y is a chlorine atom.

16. The liquid crystal device of claim 5, wherein the liquid crystalline material has a substantially constant optical axis upon application of an electric field.

17. The liquid crystal device of claim 5, wherein application of the electric field applied normal to the long axis of the liquid crystalline material reorients the liquid crystalline material either parallel or perpendicular to the electric field.

18. The liquid crystal device of claim 17, wherein the liquid crystalline material is reoriented in a bookshelf alignment.

19. The liquid crystal device of claim 17, wherein the liquid crystalline material is reoriented in a vertical alignment.

* * * * *